United States Patent [19]
Koh

[11] Patent Number: 6,069,925
[45] Date of Patent: May 30, 2000

[54] DUAL BAND, DUAL MODE TRANSCEIVER WITH ADAPTIVE SECOND IF SWITCHING DEVICE

[75] Inventor: Hyung Koh, Yongin-shi, Rep. of Korea

[73] Assignee: Samsung Electronics Co., Ltd., Rep. of Korea

[21] Appl. No.: 09/222,455

[22] Filed: Dec. 29, 1998

[30] Foreign Application Priority Data

Dec. 29, 1997 [KR] Rep. of Korea ............... 97-75985

[51] Int. Cl.[7] .................................................. H04L 27/06
[52] U.S. Cl. ...................................... 375/344; 455/553
[58] Field of Search .................................. 375/344, 376, 375/316, 364, 362, 219, 327; 455/257, 550, 552, 553, 422, 76

[56] References Cited

U.S. PATENT DOCUMENTS

| | | | |
|---|---|---|---|
| 5,722,053 | 2/1998 | Kornfeld et al. | 455/76 |
| 5,758,266 | 5/1998 | Kornfeld et al. | 455/59 |
| 5,821,820 | 10/1998 | Snider et al. | 331/48 |
| 5,856,763 | 1/1999 | Reeser et al. | 331/49 |
| 5,890,051 | 3/1999 | Schlang et al. | 455/553 |
| 5,963,852 | 10/1999 | Schlang et al. | 455/76 |
| 5,966,667 | 10/1999 | Halloran et al. | 455/552 |

*Primary Examiner*—Tesfaldet Bocure
*Attorney, Agent, or Firm*—Dilworth & Barrese

[57] ABSTRACT

An apparatus for use within a a dual band, dual mode transceiver for adaptively switching a second intermediate frequency to increase a receiving sensitivity. In the apparatus, a PLL IC compares sync data provided from a central processing unit with a reference frequency signal provided from a reference oscillator, to output AC data. A first loop filter converts the AC data to DC data with a given level according to a first band, and a second loop filter converts the AC data to DC data with a given level according to a second band. A first tank circuit connected to the first loop filter, determines a second intermediate frequency for the first band, and a second tank circuit connected to the second loop filter, determines a second intermediate frequency for the second band. A switch selects one of the second intermediate frequencies output from first and second tank circuits according to operation modes. A buffer connected to one of the first and second tank circuits through the switch, buffers the selected second intermediate frequency.

7 Claims, 2 Drawing Sheets

DUAL BAND, DUAL MODE TRANSCEIVER WITH ADAPTIVE SECOND IF SWITCHING DEVICE

BACKGROUND OF THE INVENTION

1. Field of the Invention

The present invention relates generally to portable radio communication terminals, and in particular, to a dual band, dual mode transceiver for adaptively switching the frequency band of a second IF (Intermediate Frequency).

2. Description of the Related Art

A cellular telephone, being a portable radio communication terminal, performs data transmission/reception at a specified single frequency band. Accordingly, when the single frequency band experiences excessive traffic or has a poor radio environment, connecting calls becomes increasingly difficult. Additionally, when a second intermediate frequency of the cellular telephone is improperly set, a receiving sensitivity may be affected, which deteriorates voice quality.

SUMMARY OF THE INVENTION

It is therefore an object of the present invention to provide a dual band, dual mode transceiver capable of adaptively switching the frequency band of a second intermediate frequency to increase a receiving sensitivity.

The above object of the present invention is realized by an apparatus for adaptively switching the frequency band of a second intermediate frequency of a dual band, dual mode transceiver in a portable radio communication terminal. In the apparatus, a phase locked loop integrated circuit (PLL IC) compares sync data provided from a central processing unit with a reference frequency signal provided from a reference oscillator, to output AC (Alternating Current) data. A first loop filter converts the AC data to DC (Direct Current) data with a given level according to a first band, and a second loop filter converts the AC data to DC data at a predetermined level in accordance with a second band. A first tank circuit connected to the first loop filter, determines a second intermediate frequency for the first band, and a second tank circuit connected to the second loop filter, determines a second intermediate frequency for the second band. A switch selects one of the second intermediate frequencies output from first and second tank circuits according to operation modes. A buffer connected to one of the first and second tank circuits through the switch, buffers the selected second intermediate frequency.

Preferably, the first band is an AMPS (Advanced Mobile Phone Service) band and the second band is a PCS (Personal Communication Service) band, and the operation modes include an AMPS mode and a PCS mode.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

Figure 1:
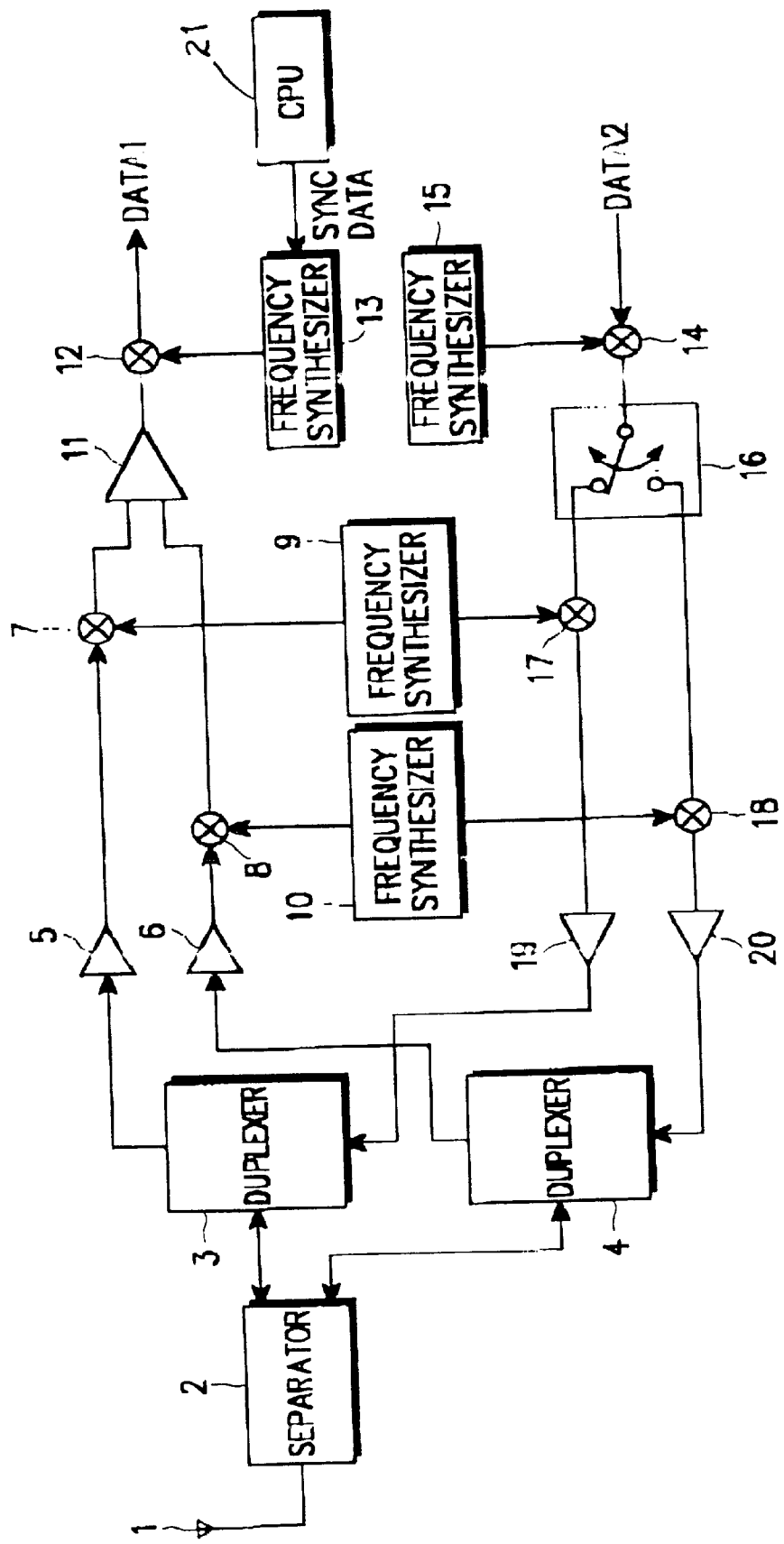
FIG. 1 is a schematic block diagram of a dual band, dual mode transceiver according an embodiment of the present invention.

FIG. 1 illustrates a schematic block diagram of an exemplary embodiment of a dual band, dual mode transceiver. The embodiment preferably includes a dual band, dual mode transceiver having a first band for AMPS (Advanced Mobile Phone Service; 824–894 MHz) and a second band for PCS (Personal Communication Service; 1850–1990 MHz).

Referring to FIG. 1, the operation of an exemplary embodiment of the dual band, dual mode transceiver in accordance with the teachings of the present invention will now be described.

An antenna 1 receives/transmits dual band data of the AMPS band (824–894 MHz) and the PCS band (1850–1990 MHz). A separator 2 separates the AMPS band from the PCS band. A first duplexer 3 for the AMPS band separates a transmission frequency band (824–849 MHz) from a reception frequency band (869–894 MHz), and a second duplexer 4 for the PCS band separates a transmission frequency band (1850–1910 MHz) from a reception frequency band (1930–1990 MHz). A low-noise amplifier 5 for the AMPS band low-noise amplifies the data in the reception frequency band separated in the duplexer 3, and a low-noise amplifier 6 for the PCS band low-noise amplifies the data in the reception frequency band separated in the duplexer 4.

A reception mixer 7 for the AMPS band mixes a radio frequency output from the low-noise amplifier 5 with a local oscillation frequency output from a frequency synthesizer 9 for the AMPS band, to output a first intermediate frequency 85.38 MHz for the AMPS band. A reception mixer 8 for the PCS band mixes a radio frequency output from the low-noise amplifier 6 with a local oscillation frequency output from a frequency synthesizer 10 for the PCS band, to output a first intermediate frequency 210.38 MHz for the PCS band. The frequency synthesizers 9 and 10 each are composed of a PLL (Phase Locked Loop) circuit, a loop filter and a voltage controlled oscillator (VCO). Specifically, the voltage controlled oscillator for the AMPS band outputs a band frequency of 954.42–979.38 MHz and the voltage controlled oscillator for the PCS band outputs a band frequency of 1719.62–1779.62 MHz. An AGC (Automatic Gain Control) amplifier 11 amplifies a signal output from the reception mixer 7 or the reception mixer 8 according to a mode selected.

A reception IF mixer 12 mixes a signal output from the AGC amplifier 11 with a second intermediate frequency of 85.38 MHz (for the AMPS band) or 210.38 MHz (for the PCS band) output from a frequency synthesizer 13 according to the selected mode, so as to output baseband data DATA1.

A transmission IF mixer 14 mixes input baseband data DATA2 with a carrier frequency 130.38 MHz generated from a frequency synthesizer 15 to output a transmission intermediate frequency 130.38 MHz. The frequency synthesizer 15 is composed of a PLL IC (Integrated Circuit), a loop filter, and a voltage controlled oscillator which generates a constant frequency 130.38 MHz without respect to the operation modes.

A switch 16 switches the transmission intermediate frequency 130.38 MHz output from the transmission IF mixer 14 to a transmission mixer 17 for the AMPS band or a transmission mixer 18 for the PCS band according to the operation mode. The transmission mixer 17 mixes the transmission intermediate frequency output from the mixer 14 with the local oscillation frequency output from the frequency synthesizer 9 so as to output a transmission frequency for the AMPS band, in a first operation mode, i.e., AMPS mode. The transmission mixer 18 mixes the transmission intermediate frequency output from the mixer 14 with the local oscillation frequency output from the frequency synthesizer 10 so as to output a transmission frequency for the PCS band, in a second operation mode, i.e., PCS mode. A transmission amplifier 19 for the AMPS band amplifies a transmission signal output from the transmission mixer 17 and provides the amplified transmission signal to the duplexer 3. The transmission amplifier 20 for the PCS band amplifies a transmission signal output from the transmission mixer 18 and provides the amplified transmission signal to the duplexer 4.

Figure 2:
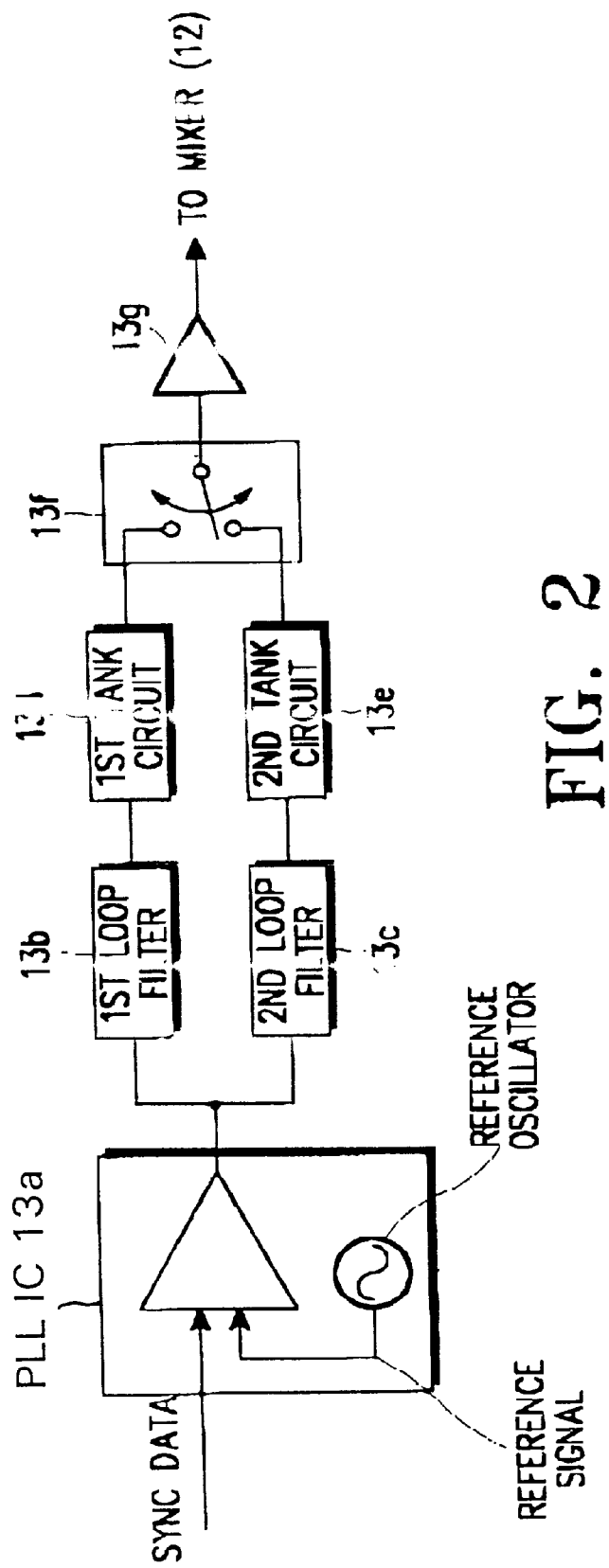
FIG. 2 is a schematic block diagram of a frequency synthesizer (13) shown in FIG. 1.

FIG. 2 illustrates a schematic block diagram of the frequency synthesizer 13 of FIG. 1. Referring to FIG. 2, the frequency synthesizer 13 is composed of a PLL IC 13a, first and second loop filters 13b and 13c, first and second tank circuits 13d and 13e, a switch 13f and a buffer 13g.

The PLL IC 13a compares sync control data provided from a CPU (Central Processing Unit) 21 with a reference frequency signal provided from a reference oscillator (not shown) and outputs AC (Alternating Current) component data for locking (or switching) the second intermediate frequency to either 85.38 MHz (for the AMPS mode) or 210.38 MHz (for the PCS mode) according to the operation mode. The first and second loop filters 13b and 13c are so designed as to convert the AC data to DC (Direct Current) data and provide the DC data to the first and second tank circuits 13d and 13e. The first and second tank circuits 13d and 13e each are of identical construction, each composed of a coil, a capacitor and a varactor having a variable capacitance value which is inversely proportional to an applied voltage, so as to generate a resonant frequency variable according to an inductance value of the coil and a capacitance value of the capacitor. The switch 13f switches an input node of the buffer 13g to the first tank circuit 13d in the first mode to generate the second intermediate frequency 85.38 MHz for the AMPS band, and to the second tank circuit 13e in the second mode to generate the second intermediate frequency 210.38 MHz for the PCS band. The buffer 13g outputs the second intermediate frequency output from either the first or second tank circuit 13d or 13e to the reception IF mixer 12 (See FIG. 1) as the local oscillation frequency.

Based on the foregoing, it is possible to minimize the influence of an undesirable harmonic component of the second intermediate frequency on the reception frequency band, thereby increasing the receiving sensitivity. That is, when one of the two frequency bands experiences excessive traffic and/or has a poor radio environment, the cellular telephone provides the call service using the other frequency band by automatically switching the second intermediate frequency according to the operation mode.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for adaptively switching the frequency band of a second intermediate frequency in a dual mode, dual band radio transceiver for use in a cellular communication system, the apparatus comprising:

a phase locked loop integrated circuit (PLL IC) for comparing sync data with a reference frequency signal to output Alternating Current (AC) data;

a first loop filter coupled to said phase locked loop integrated circuit for converting the AC data to Direct Current (DC) data with a given level according to a first band;

a second loop filter coupled to said phase locked loop integrated circuit for converting the AC data to DC data with a given level according to a second band;

a first tank circuit connected to the first loop filter, for generating a second intermediate frequency for the first band;

a second tank circuit connected to the second loop filter, for generating a second intermediate frequency for the second band;

a switch operatively coupled to said first and second tank circuits for selecting one of the second intermediate frequencies output from said first and second tank circuits according to an operation mode; and a buffer connected to said switch, for buffering the selected second intermediate frequency to be output as a local oscillation frequency to a reception IF mixer.

2. The apparatus as claimed in claim 1, wherein the sync data is provided from a central processing unit.

3. The apparatus as claimed in claim 1, wherein the reference frequency signal is provided from a reference oscillator.

4. The apparatus as claimed in claim 1, wherein the first band is an AMPS (Advanced Mobile Phone Service) band and the second band is a PCS (Personal Communication Service) band.

5. The apparatus as claimed in claim 1, wherein the operation mode includes an AMPS mode and a PCS mode.

6. The apparatus as claimed in claim 1, wherein the first and second tank circuits each comprise a coil, a capacitor and a varactor.

7. An apparatus for adaptively switching a second intermediate frequency in a dual mode, dual band radio transceiver for use in a cellular communication system, the apparatus comprising:

means for comparing sync data with a reference frequency signal to output Alternating Current (AC) data;

first filter means coupled to said comparison means for converting the AC data to Direct Current (DC) data with a given level according to a first band;

second filter means coupled to said comparison means for converting the AC data to DC data with a given level according to a second band;

first means connected to said first filter means for generating a second intermediate frequency for the first band;

second means connected to said second filter means for generating a second intermediate frequency for the second band;

a switch operatively coupled to said first means and said second means for selecting one of the second intermediate frequencies output from said first means and said second means according to an operation mode; and a buffer connected to said switch, for buffering the selected second intermediate frequency to be output as a local oscillation frequency to a reception IF mixer.

* * * * *